3,117,110
PROCESS FOR PRODUCING SOLID CHAIN-TERMINATED POLYMERS OF ETHYLENE AND ALKYL ACRYLATES
Charles H. Madge, Dunbar, and Walter R. Nagel, Charleston, W. Va., assignors to Union Carbide Corporation, a corporation of New York
No Drawing. Filed Apr. 28, 1959, Ser. No. 809,360
8 Claims. (Cl. 260—86.7)

This invention relates to the production of chain terminated copolymers of ethylene and at least one lower alkyl acrylate.

Copolymers of ethylene and an alkyl acrylate have heretofore been prepared. However, these copolymers do not have as high an impact strength as is desired and are therefore not suitable for all applications.

It has now been found that chain terminated ethylene/alkyl acrylate copolymers can be produced which have unexpected and unobvious improved impact strength coupled with good clarity. These improvements are obtained when the alkyl acrylate concentration and chain terminator concentration in the feed are maintained within narrow critical ranges, and only when certain critical classes of chain terminators are employed. By means of this invention it is now possible to produce chain terminated ethylene/alkyl acrylate copolymers which can be used to produce film having higher impact strength and clarity than theretofore possible.

The chain terminators which can be used to produce the improved ethylene/alkyl acrylate copolymers of this invention are the saturated lower aliphatic ketones, the saturated lower alkanols and the lower alpha-olefins.

In accordance with this invention it has been found that chain terminated ethylene/alkyl acrylate copolymers having the desired high impact strength coupled with high clarity can be obtained by copolymerizing a feed mixture of ethylene containing from about 0.05 to about 1.5 mole per alkyl acrylate and the chain terminator, in the presence of a free radical catalyst. Pressures of from about 15,000 p.s.i. to about 100,000 p.s.i., or higher; and polymerization temperatures of from about 100° C. to about 350° C., preferably from about 160° C. to about 250° C. with the most preferred temperature range being between 175° C. to 225° C., are employed in the reaction.

The chain terminators which have been found useful in this invention are the saturated lower aliphatic ketones containing from 3 to about 11 carbon atoms in the molecule, the saturated alkanols containing from 1 to about 8 carbon atoms in the molecule, and the alpha olefins containing from 3 to about 10 carbon atoms in the molecule.

The concentration of the saturated lower aliphatic ketone in the feed can be from about 0.05 to about 1 mole percent, and is preferably from about 0.1 to about 0.5 mole percent, based on the ethylene content. Illustrative of the ketones which can be used in this invention are acetone, diethyl ketone, diamyl ketone, diisobutyl ketone, methylethyl ketone, methyl isopropyl ketone, ethylbutyl ketone, methyl sec.-butyl ketone, ethyl propyl ketone, diisoamyl ketone, methyl n-hexyl ketone, and the like.

The concentration of the saturated lower alkanol in the feed can be from about 0.1 to about 2.5 mole percent, and is preferably from about 0.5 to about 1 mole percent, based on the ethylene content. Illustrative of the alkanols which can be used in this invention are methanol, ethanol, propanol, isopropanol, n-butanol, isobutanol, sec.-butanol, pentanol, 3-methylbutanol-1, hexanol, octanol, and the like.

The concentration of the lower alpha olefin in the feed can be varied from about 0.1 to about 3 mole percent, and preferably from about 0.5 to about 1.5 mole percent, based on the ethylene content. Illustrative of the alpha olefins which can be used in this invention are propylene, butene-1, 2-methylbutene-1, pentene-1, 3-methylpentene-1, 4,4-dimethylpentene-1, hexene-1, octene-1, and the like.

The alkyl acrylates employed in this invention are the lower alkyl acrylates containing from 1 to about 12 carbon atoms in the alkyl radical, and preferably from 2 to about 6 carbon atoms in the alkyl radical. The alkyl acrylate is present in the feed at a concentration of from about 0.05 to about 1.5 mole percent, and preferably from about 0.2 to about 0.6 mole percent, based on the ethylene content. Illustrative of the lower alkyl acrylates which are suitable for use in this invention are ethyl acrylate, propyl acrylate, pentyl acrylate, 2-ethylhexyl acrylate, decyl acrylate, and the like; preferably free of inhibitors which are usually found in alkyl acrylates. As previously indicated, the concenrations of lower alkyl acrylate and chain terminator are critical, and should be kept within the specified limits in order to achieve the desired solid products. Exceeding the amounts indicated can result in copolymers having poor impact strengths and optical properties, and in some instances even to rubbery, tacky, elastomeric products which fined very little commercial use.

Among the free radical catalysts which can be used in this invention are molecular oxygen, which is one of the preferred catalysts, and materials which yield oxygen under the reaction conditions, such as the peroxides, which are known to produce free radicals during the reaction. Also suitable are the azo type catalysts, such as azo-bis isobutyronitrile. Illustrative peroxide compounds are hydrogen peroxide, persuccinic acid, lauroyl peroxide, dipropionyl peroxide, butyryl peroxide, benzoyl peroxide, acetyl peroxide, peracetic acid, di-tert.-butyl peroxide, tert.-butyl hydroperoxide, hydroxyheptyl peroxide; the alkali metal persulfates, perborates and percarbonates, diisopropyl peroxydicarbonate, and the like. A catalytic amount of catalyst sufficient to catalyze the polymerization reaction must be present, and the concentration thereof can be varied from about 0.001 to about 3 mole percent, based on the total weight of polymerizable monomers charged; and preferably less than 1 mole percent. The preferred catalyst concentration is from about 2 to about 200 parts per million.

The purity of the ethylene feed is not critical. Commercially available ethylene can be used, which generally varies in purity from about 90 to about 99.5 percent. Preferably the purity thereof should be above about 94 percent. The other gases generally found as impurities in commercial ethylene are acetylene, ethane, propane, carbon dioxide and other saturated hydrocarbons. In most cases these impurities are present in commercial ethylene at a total concentration of less than 5 percent by weight.

In the examples hereinafter shown the polymerizations were carried out in a jacketed tubular reactor. The reaction mixture comprising ethylene, lower alkyl acrylate, chain terminator, and catalyst was compressed to about 38,000 p.s.i., and fed continuously through the tubular reactor, wherein the same pressure was maintained during the polymerization. The chain terminated copolymer as formed, at an overall conversion of from about 5 to 20 percent of the charge, was intermittently discharged from the tubular reactor into a hot pot, where unreacted ethylene and trace amounts of unreacted lower alkyl acrylate and unreacted chain terminator were flashed off, and the copolymer was then extruded into a water bath to cool and be recovered. It is also possible to carry out this invention in a batchwise manner.

The unexpected and unobvious improvements achieved by the process of this invention are summarized below in the examples and in Table I. The poor impact strength, as indicated by the bag drop height test, and the poor optical properties of the unmodified homopolymeric polyethylene (Example A) are evident. While the addition of lower alkyl acrylate shows some improvement in haze and impact strength, there is still not any significant improvement in the other optical properties of the copolymer (Example B). The use of chain terminators alone (Examples C and D) shows even less of an improvement in the impact strength than is achieved by use of a lower alkyl acrylate alone, and the improvement in optical properties is of the same order. On the other hand, when a chain terminator is present with the lower alkyl acrylate to produce the alkyl acrylate copolymer, there is a consistent improvement in impact strength coupled with a consistent improvement in the optical properties.

The chain terminated ethylene/alkyl acrylate copolymers of this invention are useful in the production of molded articles, extrusions and films.

The following examples further illustrate the invention.

EXAMPLE 1

A mixture of ethylene (93.8 percent purity) containing 0.37 mole of ethyl acrylate and 1.43 moles of propylene, per 100 moles of ethylene, and 64 parts per million of oxygen was compressed to 38,000 p.s.i. The mixture was passed through a jacketed tubular reactor about 500 feet long, having an inside diameter of about one-half inch at a rate of about 1,500 pounds per hour, and at a reactor temperature of 184° C., and a reactor pressure of about 38,000 p.s.i. After passing through the reaction the hot liquid chain terminated copolymer and unreacted starting materials were discharged intermittently through a suitable control valve to a heated separating vessel where the polymer was separated and recovered. The molten polymer was extruded and pelletized. The resin was produced at a rate of 105 pounds per hour. The propylene chain terminated ethylene-ethyl acrylate copolymer had a density of 0.9255 g./cc. and a melt index of 4.5 dgm./min., and was readily converted to film by conventional procedures.

EXAMPLE 2

A mixture of ethylene (94 percent purity) containing 0.34 mole percent of ethyl acrylate, 0.76 mole percent of propylene and 64 parts per million of oxygen was polymerized at 38,000 p.s.i. and a 192° C. reactor temperature, as described in Example 1. Feed rate was about 1,900 pounds per hour and conversion was at a rate of about 243 pounds per hour. The propylene chain terminated ethylene/ethyl acrylate copolymer had a density of 0.925 g./cc. and a melt index of 6.3 dgm./min. The copolymer was milled, and then fabricated into a 1.5 mil film by the conventional tubular film preparation process. The film produced had a haze value of 2 percent. A portion of the film was used to prepare 8 x 9 inch bags which were tested for impact strength by the Bag Drop Test and a value of 6.3 feet was obtained. This Bag Drop Test value compares with a value of 4 feet for a bag prepared from a sample of unmodified polyethylene film prepared from homopolymeric polyethylene produced by a process similar to that described herein. Additional data is tabulated in Table I below.

EXAMPLE 3

A mixture of ethylene (94.2 percent purity) containing 0.38 mole percent ethyl acrylate, 0.85 mole percent propylene, and 70 parts per million of oxygen was polymerized at 38,000 p.s.i. and a 203° C. reactor temperature, as described in Example 1. Feed rate was about 1,940 pounds per hour, and conversion was at a rate of about 215 pounds per hour. The propylene terminated ethylene/ethyl acrylate copolymer had a density of 0.927 g./cc. and a melt index of 2.0 dgm./min., and was readily converted to film by conventional procedures.

EXAMPLE 4

A mixture of ethylene (94.4 percent purity) containing 0.22 mole percent ethyl acrylate, 0.86 mole percent isopropanol, and 52 parts per million of oxygen was polymerized at 38,000 p.s.i. and a 195° C. reactor temperature, as described in Example 1. Feed rate was about 1,950 pounds per hour, and conversion was at a rate of about 273 pounds per hour. The isopropanol terminated ethylene/ethyl acrylate copolymer had a density of 0.927 g./cc. and a melt index of 1.9 dgm./min. The copolymer was milled and then fabricated into a 1.5 mil film by conventional tubular processes as described in Example 2. The film had a haze value of 8 percent and an impact strength by the Bag Drop Test of 8.2 feet. Additional data is tabulated below in Table I.

EXAMPLE 5

A mixture of ethylene (94 percent purity) containing 0.51 mole percent ethyl acrylate, 0.76 mole percent isopropanol, and 63 parts per million oxygen was polymerized at 38,000 p.s.i. and a 200° C. reactor temperature, as described in Example 1. Feed rate was about 1,860 pounds per hour, and conversion was at a rate of about 258 pounds per hour. The isopropanol terminated ethylene/ethyl acrylate copolymer had a density of 0.928 g./cc. and a melt index of 7.8 dgm./min., and was readily converted to film by conventional procedures.

EXAMPLE 6

A mixture of ethylene (94 percent purity) containing 0.43 mole percent ethyl acrylate, 0.12 mole percent diethyl ketone, and 57 parts per million of oxygen was polymerized at 38,000 p.s.i. and a 196° C. reactor temperature, as described in Example 1. Feed rate was about 1,940 pounds per hour, and conversion was at a rate of about 206 pounds per hour. The diethyl ketone terminated ethylene/ethyl acrylate copolymer had a density of 0.933 g./cc. and a melt index of 9.2 dgm./min. The copolymer was milled and then fabricated into a 1.5 mil film as described in Example 2. The film had a haze value of 2 percent, and an impact strength by the Bag Drop Test of 9.5 feet. Additional data is tabulated in Table I.

EXAMPLE 7

A mixture of ethylene (94 percent purity) containing 0.27 mole percent ethyl acrylate, 0.12 mole percent diethyl ketone, and 56 parts per million oxygen was polymerized at 38,000 p.s.i. and a 196° C. reactor temperature, as described in Example 1. Feed rate was about 1,930 pounds per hour, and conversion was at a rate of about 308 pounds per hour. The ketone terminated ethylene/ethyl acrylate copolymer had a density of 0.927 g./cc. and a melt index of 3.61 dgm./min. and was readily converted to film by extrusion by the conventional procedures. The data is tabulated in Table I.

In Table I below, the physical properties of the chain terminated lower alkyl acrylate/ethylene copolymers produced by the process of this invention are compared with an unmodified polyethylene homopolymer, with an ethylene/ethyl acrylate copolymer, and with a chain terminated polyethylene homopolymer, all of which were prepared in a similar manner; these control runs are designated A to D.

The data tabulated in Table I below was obtained by the following test procedure:

| | |
|---|---|
| Melt index | A.S.T.M. D1238–52T. |
| Density | Hunter and Oaks, Trans. Faraday Soc., 41, 49. |
| Elongation | A.S.T.M. D882–54T Method B. |
| Specular light transmission | A.S.T.M. D636–54. |
| Specular gloss | A.S.T.M. D523–53T. |
| Haze | A.S.T.M. D1003–52. |
| Gas permeability | A.S.T.M. D1434–56T. |
| Shrinkage | Three test specimens 1 inch M.D. by 12½ inches T.D. and three test specimens 1 inch T.D. by 12½ inches M.D. are floated on a 90° C. glycerine bath for 5 minutes ±15 seconds. The specimens are measured to the nearest 0.01 inch at room temperature before and after floating and the percent shrinkage is calculated from these measurements. |
| Bag Drop Test | Five samples of film 19 inches by 17½ inches are folded into an 8 by 19 inch bag and heat sealed across the side and bottom. Each bag is filled with 10 lb. of dry sand and closed at the top with wire twistems. The bag is dropped at intervals of one foot until failure, other than along seams or obvious die lines, occurs. The average of five failures is reported. |

*Table I*

| Example | A | B | C | D | 2 | 4 | 6 | 7 |
|---|---|---|---|---|---|---|---|---|
| Ethyl acrylate in feed, mole percent | 0 | 0.50 | 0 | 0 | 0.34 | 0.22 | 0.43 | 0.27 |
| Propylene in feed, mole percent | 0 | 0 | 1.0 | 0 | 0.76 | 0 | 0 | 0 |
| Diethyl ketone in feed, mole percent | 0 | 0 | 0 | 0.17 | 0 | 0 | 0.12 | 0.12 |
| Isopropanol in feed, mole percent | 0 | 0 | 0 | 0 | 0 | 0.86 | 0 | 0 |
| Density, g./cc. | 0.921 | 0.926 | 0.922 | 0.921 | 0.925 | 0.927 | 0.933 | 0.927 |
| Melt index, dgm./min. | 2.3 | 4.2 | 2.27 | 2.82 | 6.3 | 1.9 | 9.2 | 3.61 |
| Elongation, percent: | | | | | | | | |
| MD | 320 | 445 | 330 | 200 | 455 | 380 | 565 | |
| TD | 460 | 610 | 460 | 440 | 560 | 475 | 690 | |
| Shrinkage, percent: | | | | | | | | |
| MD | | | −7.63 | −8.03 | −2.27 | | −1.31 | |
| TD | | | +1.32 | +1.51 | +0.46 | | +0.39 | |
| Specular light transmission, percent | 32 | 20 | 80 | 77 | 58 | | 76 | 99.9 |
| Specular gloss, 90 × 10⁻³ | 78 | 66 | 126 | 92 | 109 | 96 | 152 | |
| Haze, percent | 16 | 6 | 4.1 | 5.5 | 2 | 8 | 2 | 5.9 |
| Gas permeability, oxygen, cc./100 sq. in./24 hr. | | 570 | 298 | 341 | 710 | 535 | 940 | |
| Bag drop height, ft | 4 | 7 | 5.2 | 5 | 6.3 | 8.2 | 9.5 | |

What is claimed is:

1. A process for producing solid chain terminated polymers of ethylene and a copolymerizable alkyl acrylate containing from 1 to 12 carbon atoms in the alkyl radical thereof, which process comprises polymerizing at a temperature of from about 100° C. to about 350° C. and under a pressure of at least about 15,000 p.s.i. in the presence of a catalytic amount of a free radical catalyst, a polymerizable mixture consisting of (a) ethylene, (b) from 0.05 mole to 1.5 moles of said alkyl acrylate, per 100 moles of ethylene, and (c) a chain terminator selected from the group consisting of (i) a saturated aliphatic ketone containing from 3 to 11 carbon atoms at a concentration of from 0.05 to 1 mole, per 100 moles of ethylene, (ii) a saturated alkanol containing from 1 to 8 carbon atoms at a concentration of from 0.1 to 2.5 moles, per 100 moles of ethylene, and (iii) an alpha olefin containing from 3 to 10 carbon atoms at a concentration of from 0.1 to 3 moles, per 100 moles of ethylene.

2. A process as claimed in claim 1, wherein from about 0.2 to about 0.6 mole of at least one lower alkyl acrylate and from about 0.05 to about 1 mole of at least one saturated aliphatic ketone, per 100 moles of ethylene, are present in the polymerizable mixture.

3. A process as claimed in claim 1, wherein from about 0.2 to about 0.6 mole of at least one lower alkyl acrylate and from about 0.1 to about 2.5 moles of at least one saturated alkanol, per 100 moles of ethylene, are present in the polymerizable mixture.

4. A process as claimed in claim 1, wherein from about 0.2 to about 0.6 mole of at least one lower alkyl acrylate and from about 0.1 to about 3 moles of at least one alpha olefin containing from 3 to 10 carbon atoms, per 100 moles of ethylene, are present in the polymerizable mixture.

5. A process as claimed in claim 1, wherein from about 0.1 to about 0.5 mole of diethyl ketone, per 100 moles of ethylene, is present in the polymerizable mixture as chain terminator.

6. A process as claimed in claim 1, wherein from about 0.5 to about 1 mole of isopropanol, per 100 moles of ethylene, is present in the polymerizable mixture as chain terminator.

7. A process as claimed in claim 1, wherein from about 0.5 to about 1.5 moles of propylene, per 100 moles of ethylene, is present in the polymerizable mixture.

8. A chain terminated polymer of ethylene and an alkyl acrylate having in the molecule thereof polymerized ethylene molecules and polymerized alkyl acrylate molecules containing from 1 to 12 carbon atoms in the alkyl radical thereof, and as a chain terminator in said polymer the chain terminating radical of a member selected from the group consisting of (i) a saturated aliphatic ketone containing from 3 to 11 carbon atoms, (ii) a saturated alkanol containing from 1 to 8 carbon atoms, and (iii) an alpha olefin containing from 3 to 10 carbon atoms, said chain terminated polymer being obtained by the process of claim 1.

References Cited in the file of this patent

UNITED STATES PATENTS

| | | |
|---|---|---|
| 2,394,960 | Young | Feb. 12, 1946 |
| 2,404,220 | D'Alelio | July 6, 1946 |
| 2,414,311 | Larson | Jan. 14, 1947 |
| 2,704,753 | Monaghan | Mar. 22, 1955 |
| 2,772,259 | Hagemayer | Nov. 27, 1956 |
| 2,953,551 | White | Sept. 20, 1960 |

OTHER REFERENCES

Basu et al.: Proceedings of the Royal Society, London, 202A, 485 (1950), page 493.

Dunbrook: Chemical Abs., vol. 42, p. 2466c (1948).

UNITED STATES PATENT OFFICE
CERTIFICATE OF CORRECTION

Patent No. 3,117,110                         January 7, 1964

Charles H. Madge et al.

It is hereby certified that error appears in the above numbered patent requiring correction and that the said Letters Patent should read as corrected below.

Column 1, line 29, for "theretofore" read -- heretofore --; line 39, for "per" read -- percent --; column 2, line 29, for "fined" read -- find --.

Signed and sealed this 30th day of June 1964.

(SEAL)
Attest:

ERNEST W. SWIDER
Attesting Officer

EDWARD J. BRENNER
Commissioner of Patents